(12) United States Patent
Hirata

(10) Patent No.: US 11,197,065 B2
(45) Date of Patent: Dec. 7, 2021

(54) GAS DETECTION DEVICE, INFORMATION PROCESSING DEVICE, AND PROGRAM

(71) Applicant: KONICA MINOLTA, INC., Chiyoda-ku (JP)

(72) Inventor: Saori Hirata, Chiyoda-ku (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 16/291,139

(22) Filed: Mar. 4, 2019

(65) Prior Publication Data

US 2020/0059624 A1 Feb. 20, 2020

(30) Foreign Application Priority Data

Aug. 20, 2018 (JP) .............................. JP2018-153940

(51) Int. Cl.
| | |
|---|---|
| *H04N 7/18* | (2006.01) |
| *H04N 21/47* | (2011.01) |
| *H04N 5/225* | (2006.01) |
| *G06T 7/00* | (2017.01) |
| *G01M 3/38* | (2006.01) |
| *G01M 3/00* | (2006.01) |
| *H04N 21/431* | (2011.01) |

(52) U.S. Cl.
CPC ............ *H04N 21/47* (2013.01); *G01M 3/002* (2013.01); *G01M 3/38* (2013.01); *G06T 7/0004* (2013.01); *H04N 5/2258* (2013.01); *H04N 21/4316* (2013.01); *G06T 2207/10048* (2013.01); *G06T 2207/30108* (2013.01)

(58) Field of Classification Search
CPC .................................................. H04N 5/44591
USPC .......................................................... 348/125
See application file for complete search history.

(56) References Cited

U.S. PATENT DOCUMENTS

| | | | | |
|---|---|---|---|---|
| 4,772,789 A | * | 9/1988 | Maram | G01M 3/38 |
| | | | | 250/330 |
| 7,189,970 B2 | * | 3/2007 | Racca | G01M 3/38 |
| | | | | 250/338.5 |
| 7,385,681 B2 | * | 6/2008 | Ninomiya | F23N 5/24 |
| | | | | 356/5.01 |
| 9,464,984 B2 | * | 10/2016 | Schmidt | H04N 5/2256 |

(Continued)

FOREIGN PATENT DOCUMENTS

| | | |
|---|---|---|
| JP | 05-307013 | 11/1993 |
| JP | 2005-037366 | 2/2005 |

(Continued)

*Primary Examiner* — Leron Beck
(74) *Attorney, Agent, or Firm* — Cozen O'Connor

(57) ABSTRACT

Provided are a gas detection device, an information processing device, and a program which enable a user himself/herself to easily determine whether a gas leak has occurred. The gas detection device includes: a first imaging section configured to capture an image of an inspection region in an infrared region; a second imaging section configured to capture an image of the inspection region in a wavelength range that is not influenced by light absorption by gas; and a hardware processor configured to perform image processing for detecting a gas in a first image captured by a first imaging section, and to perform control to simultaneously display various types of images on a display section from a display target image group including the first image, a second image captured by a second imaging section, and a third image subjected to the image processing.

18 Claims, 4 Drawing Sheets

(56) References Cited

U.S. PATENT DOCUMENTS

| | | | | |
|---|---|---|---|---|
| 10,473,550 | B2 * | 11/2019 | Li | G01N 21/35 |
| 2013/0050453 | A1 * | 2/2013 | Bergstrom | G01J 5/0275 |
| | | | | 348/61 |
| 2014/0139643 | A1 * | 5/2014 | Hogasten | H04N 5/33 |
| | | | | 348/48 |
| 2018/0027205 | A1 * | 1/2018 | Ruther | G01J 5/025 |
| | | | | 348/164 |

FOREIGN PATENT DOCUMENTS

| WO | WO 2015/137019 | 9/2015 |
|---|---|---|
| WO | WO 2016/143754 | 9/2016 |
| WO | WO 2017/122660 | 7/2017 |

\* cited by examiner

GAS DETECTION DEVICE, INFORMATION PROCESSING DEVICE, AND PROGRAM

CROSS REFERENCE TO RELATED APPLICATIONS

The entire disclosure of Japanese patent Application No. 2018-153940 filed on Aug. 20, 2018, is incorporated herein by reference in its entirety.

BACKGROUND

Technological Field

The present invention relates to a gas detection device, an information processing device, and a program.

Description of Related Art

For example, WO 2016/143754 discloses a gas detection device that estimates a gas leak position by capturing an image in an infrared region that is influenced by light absorption by gas.

In this technique, a gas is automatically detected from an infrared image, and a superimposed image on which a gas image detected as a gas is superimposed on an image captured by visible light is displayed. Accordingly, a used can easily recognize a gas distribution region or a gas leak position by viewing the superimposed image.

However, when the amount of gas leak is extremely small, or when strong wind blows, the accuracy of automatically detecting a gas leak deteriorates. Also, when the temperature of the gas and the temperature of the background are the same, it is difficult to distinguish a gas image and a background image, so that the accuracy of automatically detecting a gas leak deteriorates.

In these cases, there are cases where a user himself/herself wants to determine whether a gas leak has occurred.

SUMMARY

An object of the present invention is to provide a gas detection device, an information processing device, and a program which enable a user himself/herself to easily determine whether a gas leak has occurred.

To achieve at least one of the abovementioned objects, according to an aspect of the present invention, a gas detection device reflecting one aspect of the present invention comprises:

a first imager configured to capture an image of an inspection region in an infrared region that is influenced by light absorption by gas;

a second imager configured to capture an image of the inspection region in a wavelength range that is not influenced by light absorption by gas; and a hardware processor configured to perform image processing for detecting a gas on a first image captured by the first imager, and to perform control to simultaneously display various types of images on a display from a display target image group including the first image, a second image captured by the second imager, and a third image subjected to the image processing.

To achieve at least one of the abovementioned objects, according to an aspect of the present invention, an information processing device, reflecting one aspect of the present invention comprises: a hardware processor configured to perform image processing for detecting a gas on a first image of an inspection region captured in an infrared region that is influenced by light absorption by gas, and perform control to simultaneously display various types of images on a display from a display target image group including the first image, a second image of the inspection region captured in a wavelength range that is not influenced by light absorption by gas, and a third image subjected to the image processing.

To achieve at least one of the abovementioned objects, according to an aspect of the present invention, a program reflecting one aspect of the present invention is a program causing a computer to function as an entire or part of the hardware processor of the information processing device.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Gas detection device 1 according to an embodiment of the present invention will be described below with reference to the drawings.

Figure 1:
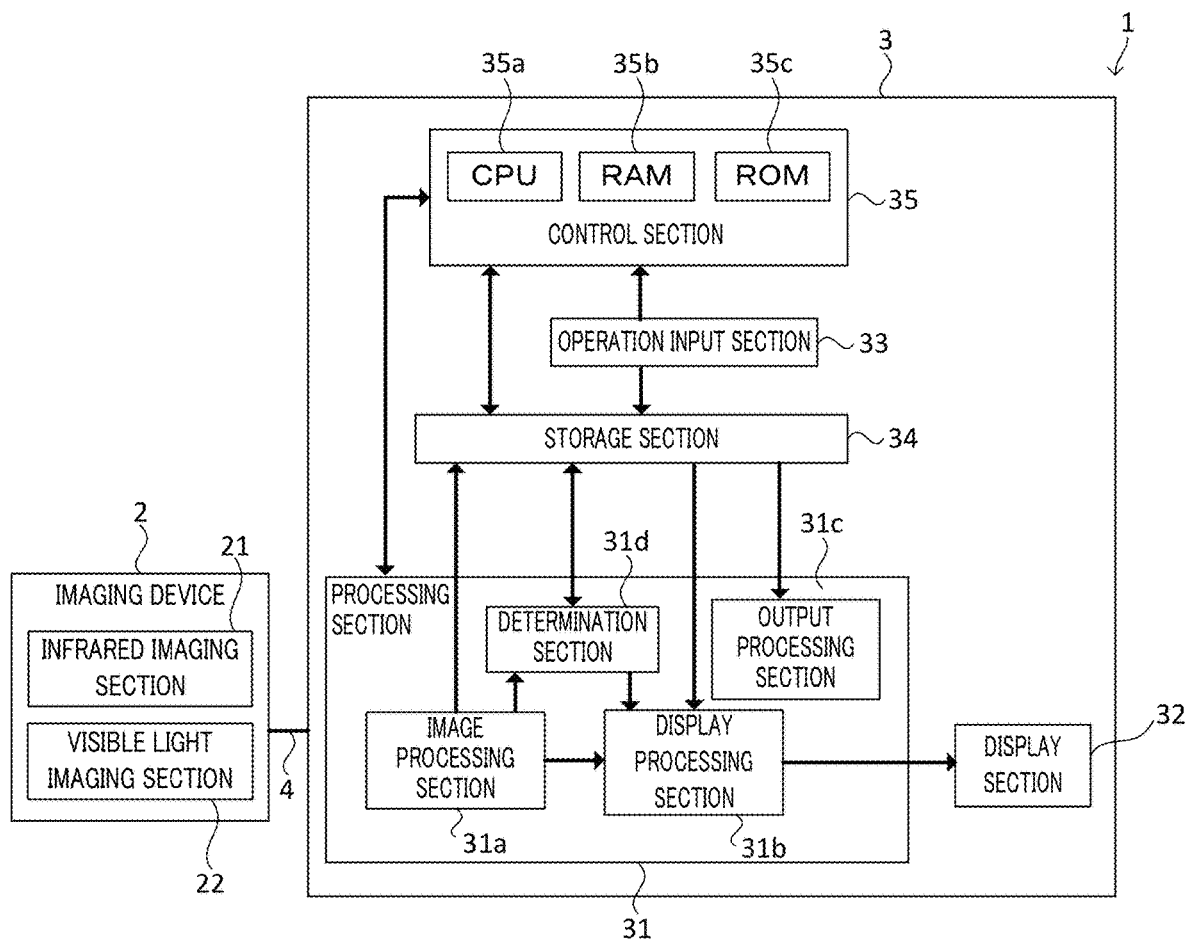
FIG. 1 is a block diagram illustrating a configuration example of a device according to an embodiment of the present invention.

FIG. 1 is a block diagram illustrating gas detection device 1. Gas detection device 1 captures, for example, an inspection region including inspection target (a plant or the like) in gas production facilities. Further, gas detection device 1 performs image processing for detecting a gas on the captured image.

Gas Detection Device

As illustrated in FIG. 1, gas detection device 1 includes imaging device 2 and gas detection device body 3. Imaging device 2 and gas detection device body 3 are connected via cable 4. Imaging device 2 may be connected to gas detection device body 3 via wireless communication. Imaging device 2 may also be connected to gas detection device body 3 via a network such as the Internet.

Imaging Device

Imaging device 2 is, for example, a portable camera device. Imaging device 2 may be a camera device that is fixed to a predetermined position. Imaging device 2 may be controlled by, for example, control section 35 of gas detection device body 3 to be described below, and a controller (not illustrated) or the like included in imaging device 2.

Imaging device 2 starts imaging, for example, when an instruction to start imaging is input from a user through operation input section 33 of gas detection device body 3.

Specifically, imaging device 2 includes infrared imaging section 21 (corresponding to a "first imaging section" of the present invention) and visible light imaging section 22 (corresponding to a "second imaging section" of the present invention).

Infrared Imaging Section

Infrared imaging section 21 includes a first optical system (not illustrated), a first optical filter (not illustrated), and an infrared sensor (not illustrated).

The first optical system focuses infrared light incident from the inspection region serving as an object on the infrared sensor.

The first optical filter is a bandpass filter or the like disposed on an optical path connecting the first optical system and the infrared sensor. The first optical filter transmits only the infrared light included in a predetermined wavelength band in the infrared light which has passed through the optical system. The pass wavelength band of the first optical filter is substantially set to an absorption wavelength band of a gas to be detected. For example, when the pass wavelength band is set to a middle wavelength range of 3.2 to 3.4 μm, a methane gas or the like can be detected.

The infrared sensor is, for example, a quantum indium antimonide (InSb) image sensor, a heat-type thermopile array sensor, or a microbolometer, and receives infrared light to generate infrared image data. Infrared imaging section 21 having such a configuration captures an image of the inspection region in a state of being synchronized with visible light imaging section 2 "first image" ally outputs infrared image data (corresponding to a "first image" of the present invention) to processing section 31 (specifically, image processing section 31a).

The infrared image data generated by infrared imaging section 21 includes data on a still image and a moving image. Such infrared image data indicates a temperature distribution in the inspection region.

Visible Light Imaging Section

Visible light imaging section 22 includes a second optical system (not illustrated), a second optical filter (not illustrated), and a visible light sensor (not illustrated).

The second optical filter is an infrared cut filter or the like disposed on an optical path connecting the optical system and the visible light sensor. The infrared cut filter cuts infrared light from the light which has passed through the optical system.

The visible light sensor is, for example, a Complementary Metal Oxide Semiconductor (CMOS) image sensor, and receives black-and-white BW visible light, or color RGB visible light to generate visible image data.

Visible light imaging section 22 having such a configuration captures, for example, an image of the inspection region including the inspection target (e.g., plant 6a illustrated in FIG. 2A) in gas production facilities, and sequentially outputs "second image" to (corresponding to a "second image" of the present invention) to processing section 31 (specifically, image processing section 31a).

The visible image data generated by visible light imaging section 22 includes data on a still image and a moving image.

Gas Detection Device Body

Gas detection device body 3 converts a gas generated in the inspection region into a visible image by using received information (infrared image data) from imaging device 2. Gas detection device body 3 having such a configuration is a mobile terminal such as a tablet terminal, a smartphone, a laptop terminal, or a wearable terminal, which is communicably connected to imaging device 2.

Gas detection device body 3 includes processing section 31, display section 32, operation input section 33, storage section 34, and control section 35.

Display Section

Display section 32 is, for example, a display of a mobile terminal constituting gas detection device body 3. As the display, a liquid crystal display, an organic EL display, or the like can be used. In the present embodiment, the display is a flat panel display with a touch panel.

Display section 32 displays various types of images based on a display signal from display processing section 31b (see FIG. 1) under control of control section 35. Specifically, display section 32 displays test image 7 (see FIG. 2A) and the like for detecting a gas by visual observation by the user.

Operation Input Section

Operation input section 33 is an input section that receives an input of, for example, imaging information. In this case, the imaging information includes various information necessary for starting imaging by imaging device 2. For example, the imaging information includes a client identification (ID), a user ID, the name of an examiner, the name of an inspection company, date and time of inspection, an inspection type, a site name, a facility name, a facility ID, and latitude and longitude measured by a Global Positioning System (GPS).

Operation input section 33 receives an operation associated with reproduction of test image data, and an operation associated with imaging by imaging device 2.

Operation input section 33 receives an output instruction. Operation input section 33 may receive, for example, the designation of items included in the output information, together with the output instruction. The items of the output information include imaging information and any other information (e.g., weather information during imaging).

In the present embodiment, operation input section 33 is composed of a flat panel display with a touch panel that is integrally provided with display section 32. The user can perform an input of imaging information, an operation of imaging device 2, and a test image data reproduction operation through operation input section 33.

Operation input section 33 is not limited to a flat display with a touch panel, but instead may be, for example, an input device such as a keyboard, a mouse, or a microphone.

Control Section

Control section 35 includes central processing unit (CPU) 35a as a calculation/control device, random access memory (RAM) 35b, and read only memory (ROM) 35c as a main storage device. ROM 35c stores basic programs and basic setting data. CPU 35a reads out programs depending on the processing content from ROM 35c or storage section 34, loads the programs into RAM 35b, and executes the loaded programs, thereby controlling the operation of each block of gas detection device 1 in a centralized manner. Control section 35 having such a configuration controls imaging device 2, display section 32, operation input section 33, and storage section 34 depending on their functions, thereby controlling the entire gas detection device 1.

In the present embodiment, the hardware pieces constituting the functional blocks and control section 35 cooperate with each other to thereby implement the functions of each functional block. Some or all the function of each functional block may be implemented in such a manner that control section 35 executes programs.

Storage Section

Storage section 34 is an auxiliary storage device such as a nonvolatile semiconductor memory (a so-called flash memory) or a hard disk drive. Storage section 34 may be a disk drive for reading and writing information by driving an optical disk such as a compact disc (CD) or a digital versatile disc (DVD), or a magneto-optical disk (MO). Further, for example, storage section 34 may be a memory card such as a Universal Serial Bus (USB) memory or a Secure Digital (SD) card.

Storage section 34 stores imaging information input from operation input section 33. Writing of data into storage section 34 and reading of data from storage section 34 are controlled by control section 35.

Processing Section

Processing section 31 is composed of at least one dedicated hardware (electronic circuit) such as a digital signal processor (DSP), an application specific integrated circuit (ASIC), or a programmable logic device (PLD). Processing section 31 includes, as functional blocks, image processing section 31a, display processing section 31b, and output processing section 31c. Each function of processing section 31 to be described below is implemented under control of control section 35.

Image Processing Section

The function of image processing section 31a will be described below. The function of image processing section 31a is implemented under control of control section 35.

Image processing section 31a receives infrared image data (hereinafter referred to as "infrared image data obtained before image processing") on the inspection region from infrared imaging section 21.

Image processing section 31a performs predetermined image processing for detecting a gas in the infrared image data on the inspection region. The infrared image data subjected to the image processing is referred to as "infrared image data obtained after image processing".

Image processing section 31a detects, for example, a portion in which a gas is present in the infrared image data obtained before image processing, and converts the detected portion into a visible image (hereinafter referred to as "gas visualization processing"). Image processing section 31a applies a specific color (red or the like) to the portion in which a gas is present in the infrared image data obtained before image processing. The infrared image data subjected to the gas visualization processing is particularly referred to as "gas image data".

A method for detecting a gas from the infrared image data in the inspection region will be briefly described. If a gas leak has occurred in the inspection region, a temperature change (i.e., a change in brightness in the infrared image data on the inspection region) occurs in the portion in which a gas is present in the infrared image data on the inspection region. Image processing section 31a detects the portion in which a gas is present based on the temperature change.

Further, image processing section 31a receives the visible image data from visible light imaging section 22. Then, image processing section 31a generates test image data by combining the gas image data with the visible image data.

Image processing section 31a outputs the test image data to display processing section 31b and storage section 34.

The present invention is not limited to this example, and image processing section 31a outputs the infrared image data obtained before image processing to display processing section 31b and storage section 34.

Image processing section 31a outputs the visible image data to display processing section 31b and storage section 34.

Storage section 34 stores the image data obtained after image processing (e.g., test image data) received from image processing section 31a. Storage section 34 stores the test image data in association with imaging information.

Storage section 34 stores the infrared image data obtained after image processing received from image processing section 31a. Storage section 34 stores the infrared image data obtained after image processing in association with the imaging information.

Storage section 34 stores the infrared image data obtained before image processing generated by infrared imaging section 21. Storage section 34 stores the infrared image data obtained before image processing in association with the imaging information.

Storage section 34 stores the visible image data generated by visible light imaging section 22. Storage section 34 stores the visible image data in association with the imaging information.

Figure 2A:
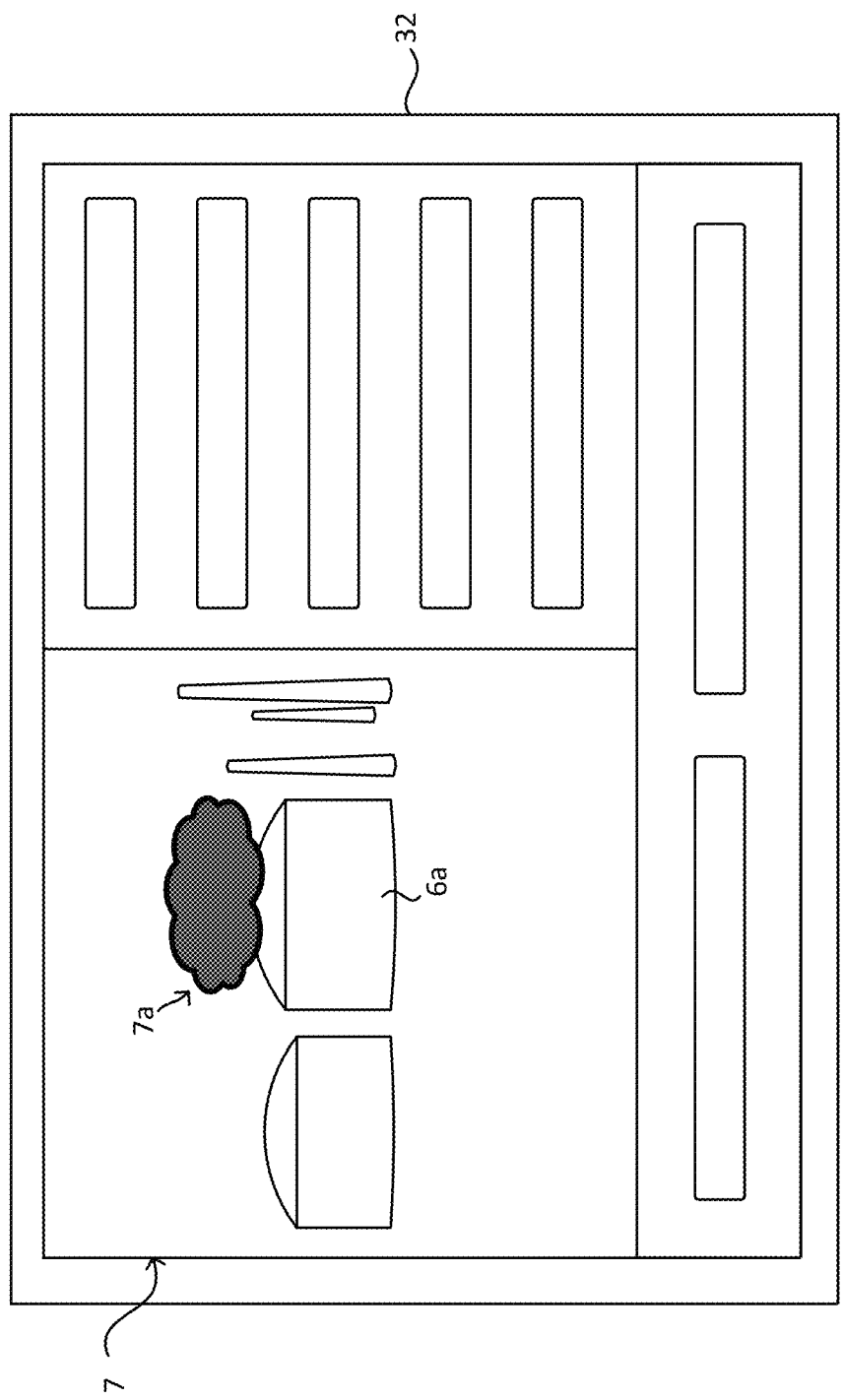
FIG. 2A is a diagram illustrating an example of various types of images displayed on a display section.

The test image data is displayed on display section 32 as test image 7 (see FIG. 2A). The specific color is applied to gas image 7a (see FIG. 2A) corresponding to the gas in test image 7.

Incidentally, when a gas leak and a temperature change in the background occur in parallel in a state where infrared imaging section 21 capture a moving image of the inspection region for the gas leakage and the background, and when the temperature change in the background is greater than the temperature change due to the gas leak, it is difficult to recognize the state of the gas leak from the moving image of the infrared image. This is because the infrared image data includes first frequency component data indicating the state of the gas leak and second frequency component data indicating a temperature change in the background and having a frequency lower than that of first frequency component data. As a result, the image indicated by the first frequency component data is hidden by the image indicated by the second frequency component data.

Accordingly, image processing section 31a performs processing for removing the second frequency component data indicating a temperature change in the background from the infrared image data as image processing for detecting a gas. The image obtained after the image processing is referred to as a "first intermediate image".

Further, image processing section 31a outputs the first intermediate image data to display processing section 31b and storage section 34.

The infrared image data includes not only the second frequency component data, but also third frequency component data indicating high-frequency noise. The high-frequency noise is mainly sensor noise in an image sensor. The third frequency component data has a frequency higher than that of the first frequency component data indicating a temperature change due to a leaked gas.

Therefore, image processing section 31a performs a process of removing the third frequency component data from the infrared image data as image processing for detecting the gas. The image after the process of removing the second and third frequency component data from the infrared image data is referred to as a "second intermediate image".

Image processing section 31a outputs the second intermediate image data to display processing section 31b and storage section 34.

When the temperature of the gas is the same as the temperature of the background, it is not easy to detect the gas in imaging by infrared imaging section 21. Even when no gas is detected, there is a need to determine whether there is no gas leak at all, or to determine whether no gas is detected because the temperature of the gas is the same as the temperature of the background.

Accordingly, image processing section 31a performs processing for generating a temperature image indicating a temperature distribution in the inspection region based on the infrared image data, as image processing for detecting a gas.

Image processing section 31a outputs temperature image data to display processing section 31b and storage section 34.

As described above, image processing section 31a outputs the test image data, the infrared image data obtained before image processing, the visible image data, the first intermediate image data, the second intermediate image data, and the temperature image data to display processing section 31b and storage section 34. Then, display processing section 31b receives these images from image processing section 31a. These various types of images are referred to as a "display target image group". One or more images in the display target image group are referred to as "various types of images".

Display Processing Section

The function of display processing section 31b will be described below. The function of display processing section 31b is implemented under control of control section 35. Display processing section 31b having such a configuration controls the display of display section 32 to be described below.

The display processing section 31b causes display section 32 to display imaging information input image (not illustrated) for inputting imaging information. Image data based on which the imaging information input image is obtained is preliminarily stored in storage section 34.

Display processing section 31b converts the various image data received from image processing section 31a into a display signal corresponding to display section 32, and outputs the display signal to cause display section 32 to display various types of images.

Setting conditions for setting the type of each image to be displayed on display section 32, a screen size, a display position, and the like are preliminarily stored in storage section 34. Further, changes of the setting conditions are received by operation input section 33 and are stored in storage section 34. Changes of the setting conditions are received regardless of whether imaging device 2 is in the process of shooting.

Display processing section 31b causes display section 32 to display one image in the display target image group with a large screen size, for example, based on initial setting conditions.

Display processing section 31b causes display section 32 to display, for example, test image 7 (see FIG. 2A), with a large screen size.

FIG. 2A is a diagram illustrating an image of test image 7 displayed on display section 32.

Display processing section 31b causes display section 32 to simultaneously display various types of images in the display target image group based on, for example, the setting conditions which are received by operation input section 33 and are changed.

Display processing section 31b causes display section 32 to display, for example, test image 7 with a large screen size. Further, display processing section 31b causes display section 32 to display three images, including first intermediate image 8a (see FIG. 2B), second intermediate image 8b (see FIG. 2B), and infrared image 8c obtained before image processing (see FIG. 2B), with a small screen size.

Figure 2B:
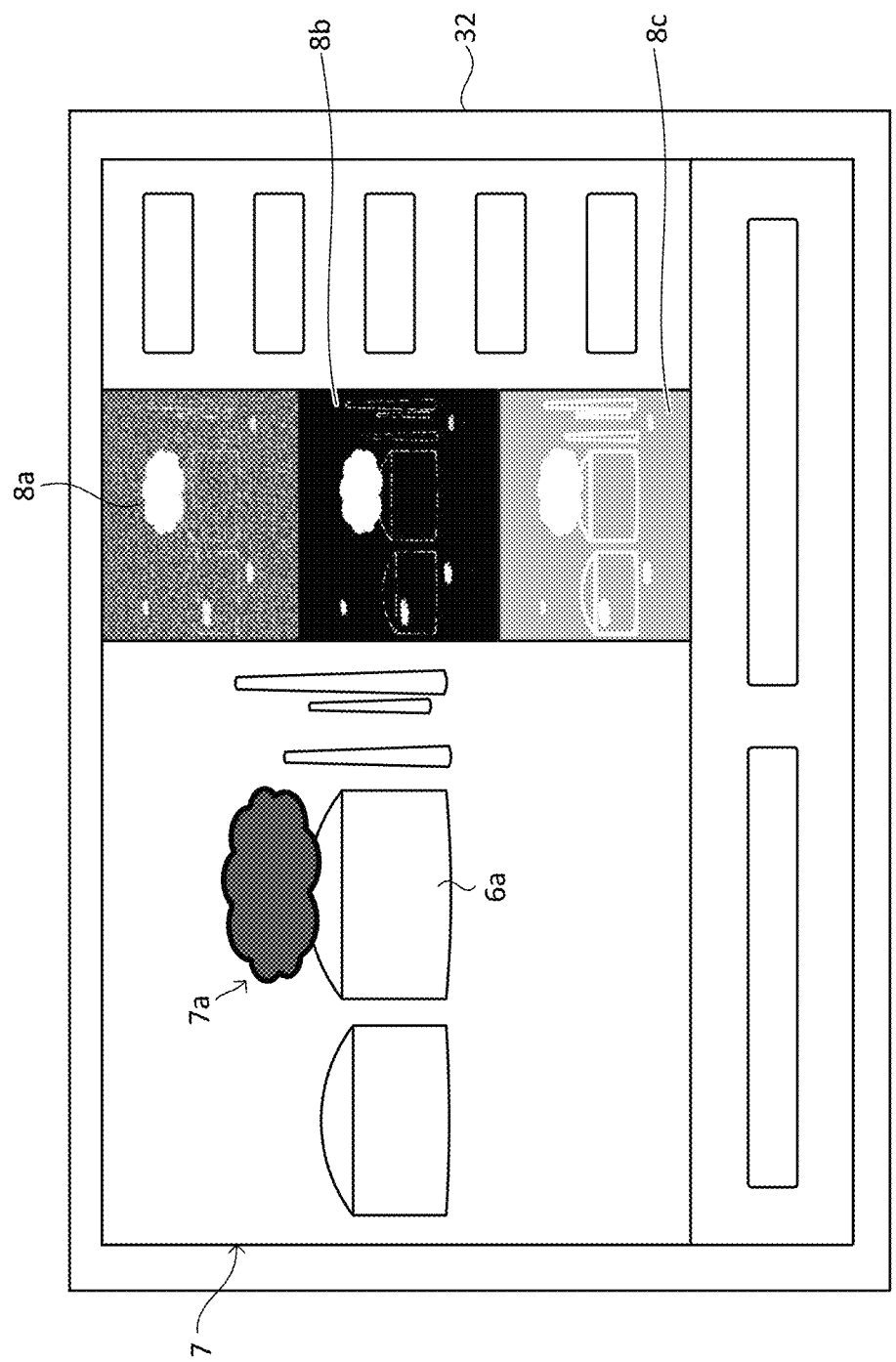
FIG. 2B is a diagram illustrating an example of a test image displayed on the display section.

FIG. 2B is a diagram illustrating examples of test image 7, first intermediate image 8a, second intermediate image 8b, and infrared image 8c obtained before image processing, which are simultaneously displayed on display section 32.

Display processing section 31b causes, for example, test image 7 displayed with a large screen size to be replaced by, for example, first intermediate image 8a displayed with a smalls screen size. As a method for switching images, for example, a large screen and a small screen can be switched by performing a touch operation on an image with a small screen size to be displayed on a large screen. Known methods carried out using operation input section 33 can be employed in addition to this method.

Display processing section 31b causes various types of images in the display target image group and one image in the display target image group to be switched and displayed. Specifically, display processing section 31b causes the images to be displayed by switching a screen for a one-screen display mode (see FIG. 2A) on which test image 7 is displayed with a screen for a multiple-screen display mode (see FIG. 2B) on which test image 7, first intermediate image 8a, second intermediate image 8b, and infrared image 8c obtained before image processing are displayed. As a screen switching method, for example, a touch operation for touching a mode switch button (not illustrated) displayed on display section 32 is used. In addition, known methods carried out using operation input section 33 can be employed.

Output Processing Section

Output processing section 31c generates output information including the test image data under control of control section 35. Output processing section 31c generates output information when an output instruction is input from operation input section 33.

Output processing section 31c outputs the output information to, for example, an output device such as a printer. The output device may be connected to gas detection device body 3 via a wired connection or wireless connection. The output device may be connected to gas detection device body 3 via a network such as the Internet. Output processing section 31c outputs the output information to, for example, a portable storage medium such as an optical disk, a magneto-optical disk, or a memory card.

When gas detection device 1 is connected to a server via a network, output processing section 31c may output the output information to the server.

Operation Example

Figure 3:
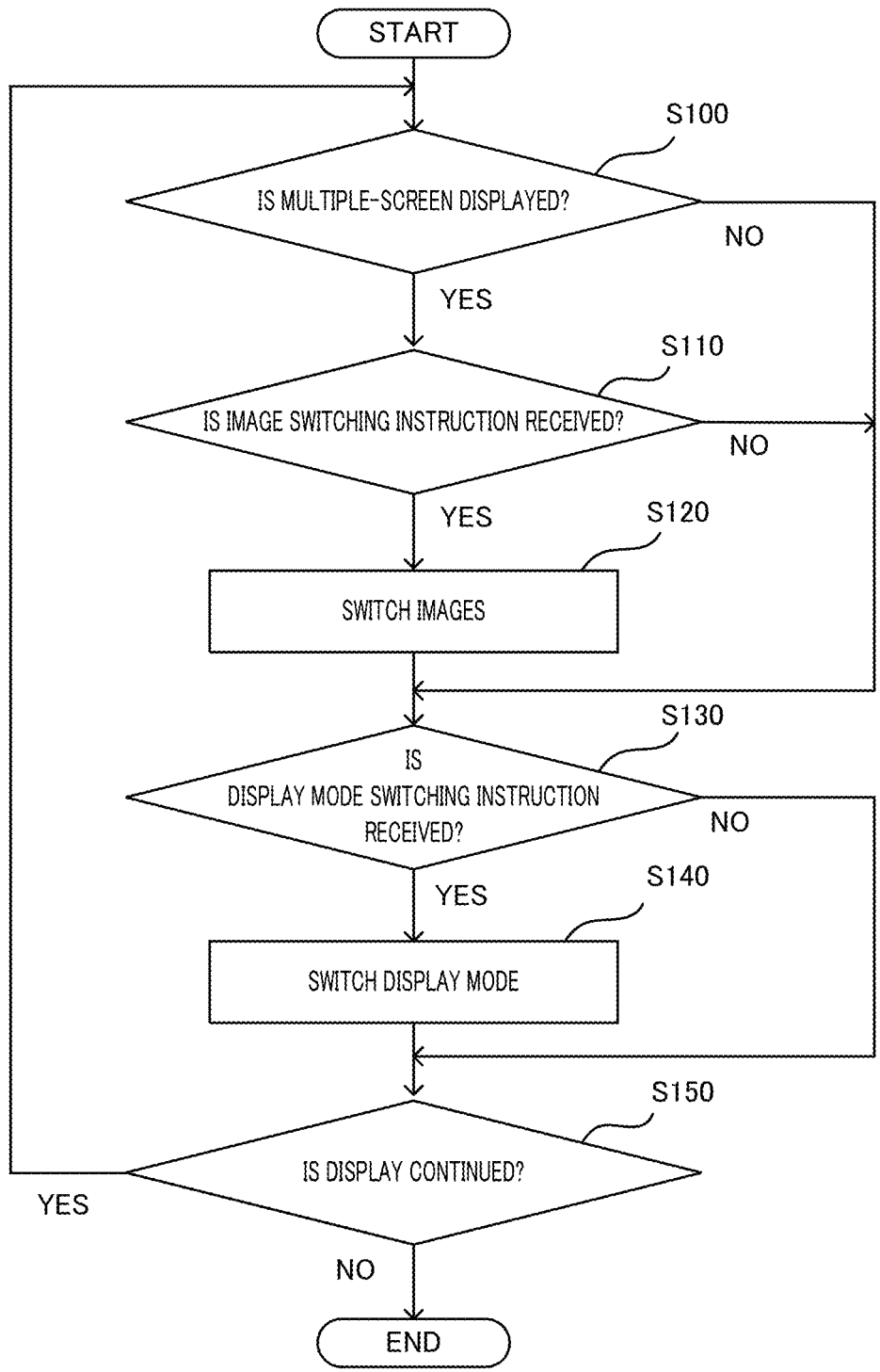
FIG. 3 is a flowchart illustrating an example of an operation of a display processing section.

Next, an operation example of display processing section 31b in gas detection device 1 according to the present embodiment will be described with reference to FIGS. 1, 2A, 2B, and 3. FIG. 3 is a flowchart showing an example of the operation of display processing section 31b. The following processing is implemented in such a manner that, for example, in gas detection device 1, CPU 35a executes a predetermined program stored in ROM 35c (see FIG. 1) when an imaging start instruction is input. Display processing section 31b converts the various image data received from image processing section 31a into a display signal corresponding to display section 32, and outputs the display signal to cause display section 32 to display various types of images.

First, in step S100 illustrated in FIG. 3, display processing section 31b determines whether a multiple-screen display (display of various types of images) is set. If the multiple-screen display is set (YES in step S100), the processing shifts to step S110. If the multiple-screen display is not set (NO in step S100), the processing shifts to step S130.

In step S110, display processing section 31b determines whether an image switching instruction is received from control section 35. If the image switching instruction is received (YES in step S110), the processing shifts to step S120. If the image switching instruction is not received (NO in step S110), the processing shifts to step S130.

In step S120, display processing section 31b switches the images to be displayed. After that, the processing shifts to step S130.

In step S130, display processing section 31b determines whether a display mode switching instruction for switching between the multiple-screen display mode and the one-screen display mode is received from control section 35. If the display mode switching instruction is received (YES in step S130), the processing shifts to step S140. If the display mode switching instruction is not received (NO in step S130), the processing shifts to step S150.

In step S140, display processing section 31b performs display processing for switching the screen from one of the one-screen display mode and the multiple-screen display mode to the other of the one-screen display mode and the multiple-screen display mode.

In step S150, display processing section 31b determines whether the display is continued. If the display is continued (YES in step S150), the processing returns to first step S100. If the display is not continued (NO in step S150), the processing ends.

Operation and Effects

Gas detection device 1 according to the embodiment described above includes infrared imaging section 21 that captures an image in an infrared region that is influenced by light absorption by gas; visible light imaging section 22 that captures an image in a wavelength range that is not influenced by light absorption by gas; image processing section 31a that performs image processing for detecting a gas on infrared image data in an inspection region in which imaging is performed by infrared imaging section 21 in real time; and display processing section 31b that causes display section 32 to simultaneously display various types of images in the display target image group including the infrared image, a visible image in the inspection region in which imaging is performed by visible light imaging section 22 in real time, and an image obtained after the image processing performed by image processing section 31a. Since various types of images can be visually observed simultaneously, whether a gas leak has occurred can be examined in a diversified manner, as compared with a case where one image is visually observed. Consequently, the user himself/herself can easily determine whether a gas leak has occurred.

Further, since test image 7, which is obtained by combining gas image 7a with the visible image, is displayed on display section 32, the user himself/herself can easily determine a region in which a gas is distributed in the inspection region and a gas leak position.

Further, one image in the display target image group and the various types of images in the display target image group are switched and displayed. As a result, one image can be visually recognized by, for example, displaying it in a large screen size, so that it is possible for the user himself/herself to more easily determine the gas leakage.

Further, the images subjected to image processing include first intermediate image 8a and second intermediate image 8b. Thus, since test image 7 and first intermediate image 8a, for example, can be compared with each other and visually observed, an occurrence of a gas leak can be accurately determined.

In the embodiments described above, when display processing section 31b causes, for example, test image 7 (see FIG. 2A) to be displayed in the one-screen display mode, other various types of images converted into thumbnail images may be displayed on the same screen together with the test image. In this case, switching between the selected image and test image 7 may be performed by selecting other various types of images converted into thumbnail images. Switching between various types of images can be performed by a simple operation, and thus a work for checking a gas leak can be reduced.

In the embodiments described above, visible light imaging section 22 is illustrated as an example of the camera that captures an image in the wavelength range that is not influenced by light absorption by gas. However, the present invention is not limited to this example. For example, an infrared camera that captures an image in the infrared region that is not influenced by light absorption by gas may be used.

In the embodiments described above, display processing section 31b converts various image data received from image processing section 31a into a display signal corresponding to display section 32, and outputs the display signal to cause display section 32 to display various types of images. The present invention is not limited to this example. For example, when gas detection device 1 is connected to a server via a network, output processing section 31c may transmit various types of images to the server. The various types of images received by the server may be displayed on a display section (such as a display) connected to the server (including a connection via a network). According to this configuration, a person different from a photographer can visually observe various types of images in real time from a remote location. Therefore, even if the photographer does not have much experience in inspecting a gas leak, an experienced examiner located at a remote location can appropriately determine a gas leak or the like.

Although the embodiments described above illustrate an example in which the first intermediate image, the second intermediate image, and the temperature image are used as the third image, the present invention is not limited to this example. As the third image, for example, a difference image between frames of infrared image data may be used, and an image obtained by performing known image processing for extracting a gas image by analyzing an infrared image may also be used.

Modified Example 1

Next, Modified Example 1 of the present embodiment will be described.

In the embodiments described above, display processing section 31b converts various image data received from image processing section 31a into a display signal corresponding to display section 32, and outputs the display signal to cause display section 32 to display various types of images.

On the other hand, in Modified Example 1, for example, when a reproduction start instruction is input through operation input section 33, display processing section 31b converts various image data stored in storage section 34 into a display signal corresponding to display section 32, and outputs the display signal to cause display section 32 to display various types of images. In this case, examples of various types of images include an infrared image that is previously captured and stored, a visible image, and an image subjected to image processing, including test image 7 (see FIG. 2A). Thus, since current test image 7 and the previous test image 7 can be compared with each other and visually observed, an occurrence of a gas leak can be accurately determined.

Modified Example 2

Next, Modified Example 2 of the present embodiment will be described.

In the embodiments described above, display processing section 31b causes display section 32 to display various types of images in the display target image group based on setting conditions.

On the other hand, in Modified Example 2, for example, gas detection device 1 includes determination section 31d (see FIG. 1) that determines a degree of accuracy of detection when an occurrence of a gas leak is automatically detected. The determination result of determination section 31d and the type of each image displayed on display section 32 are associated and preliminarily stored in storage section 34. For example, test image 7 (see FIG. 2A) and the temperature image are used as images based on which determination section 31d makes a determination. However, the present invention is not limited to this example. Determination section 31d determines the degree of accuracy of detection when an occurrence of a gas leak is automatically detected from various perspectives, or from a wide perspective. Examples of items for which the degree of accuracy of detection is determined include a wind speed, a wind direction, a temperature, an amount of solar radiation. These values can be measured by various sensors, and the information can be obtained via the Internet or the like.

Display processing section 31b receives the determination result from determination section 31d, and receives various types of images from image processing section 31a and causes display section 32 to display the images based on the type of each image associated with the received determination result. For example, when the accuracy of automatically detecting an occurrence of a gas leak is high, display processing section 31b causes display section 32 to display infrared image 8c obtained before image processing (see FIG. 2B) and the visible image as various types of images. On the other hand, when the accuracy of automatically detecting an occurrence of a gas leak is low, display processing section 31b causes display section 32 to display first intermediate image 8a (see FIG. 2B) and second intermediate image 8b (see FIG. 2B) as various types of images. Therefore, the type of each image to be displayed on display section 32 is automatically changed and there is no need to perform, for example, a work for changing the setting conditions through operation input section 33. Consequently, the efficiency for determining an occurrence of a gas leak can be increased.

Although embodiments of the present invention have been described and illustrated in detail, the disclosed embodiments are made for purposes of illustration and example only and not limitation. The scope of the present invention should be interpreted by terms of the appended claims.

What is claimed is:

1. A gas detection device, comprising:
   a first imager configured to capture a moving image of an inspection region in an infrared region that is influenced by light absorption by gas;
   a second imager configured to capture a moving image of the inspection region in a wavelength range that is not influenced by light absorption by gas; and
   a hardware processor configured to perform image processing for detecting a gas on a first moving image captured by the first imager, and to perform control to simultaneously display various types of moving images on a display from a display target image group including the first moving image, and a third moving image subjected to the image processing,
   wherein the hardware processor is further configured to perform control to display a first-sized moving image in a first region of a display surface of the display, to display a second-sized moving image, smaller than the first-sized moving image, in a plurality of second regions which are apposed to the first region and are each smaller than, and do not overlap with, the first region, to display various types of moving images in the first region and the second regions from the display target image group, and, upon selection of the second-sized moving image displayed in the second region, replacing the first-sized moving image with the selected second-sized moving image so as to display in the first region a first-sized moving image corresponding to the selected second-sized moving image, and
   wherein the third image includes a gas moving image obtained by processing for removing second frequency component data indicating a temperature change in a background and having a frequency lower than that of first frequency component data caused by a gas leak from the first moving image.

2. The gas detection device according to claim 1, wherein the gas detection device includes:
   a one-screen display mode to display one moving image from the display target image group and
   a multiple-screen display mode to display a plurality of moving images from the display target image group on the first region and second region,
   wherein the hardware processor configured to perform switching the one-screen display mode and the multiple-screen display mode based on an operation for a mode switch button.

3. The gas detection device according to claim 1, wherein the third moving image includes a test image as a combination of a second moving image and a gas moving image obtained by converting a portion in which a gas is present into a visible moving image.

4. The gas detection device according to claim 1, wherein the third moving image includes a moving image indicating a temperature distribution of the first moving image.

5. The gas detection device according to claim 1, wherein the second imager is a visible light imager configured to capture a moving image in a visible range.

6. The gas detection device according to claim 1, wherein moving images to be displayed on the display include the first moving and the third moving image subjected to image processing previously.

7. The gas detection device according to claim 1, wherein the hardware processor determines a degree of accuracy of detection in automatically detecting whether a gas leak has occurred in the inspection region, and controls display of various types of moving images corresponding to determination results.

8. An information processing device, comprising a hardware processor configured to perform image processing for detecting a gas on a first moving image of an inspection region captured in an infrared region that is influenced by light absorption by gas, and perform control to simultaneously display various types of moving images on a display from a display target image group including the first moving image, and a third moving image subjected to the image processing,
wherein the hardware processor is further configured to perform control to display a first-sized moving image in a first region of a display surface of the display, to display a second-sized moving image, smaller than the first-sized moving image, in a plurality of second regions which are apposed to the first region and are each smaller than, and do not overlap with, the first region, to display various types of moving images in the first region and the second regions from the display target image group, and, upon selection of the second-sized moving image displayed in the second region, replacing the first-sized moving image with the selected second-sized moving image so as to display in the first region a first-sized moving mage corresponding to the selected second-sized moving image, and
wherein the third image includes a gas moving image obtained by processing for removing second frequency component data indicating a temperature change in a background and having a frequency lower than that of first frequency component data caused by a gas leak from the first moving image.

9. A non-transitory computer-readable storage medium storing a program causing a computer to execute an entire or part of processing for performing image processing for detecting a gas on a first moving image of an inspection region captured in an infrared region that is influenced by light absorption by gas, and performing control to simultaneously display various types of moving images on a display from a display target image group including the first moving image, and a third moving image subjected to the image processing,
wherein the program further causes the computer to perform control so as to display a first-sized moving image in a first region of a display surface of the display, to display a second-sized moving image, smaller than the first-sized moving image, in a plurality of second regions which are apposed to the first region and are each smaller than, and do not overlap with, the first region, to display various types of moving images in the first region and the second regions from the display target image group, and, upon selection of the second-sized moving image displayed in the second region, replacing the first-sized moving image with the selected second-sized moving image so as to display in the first region a first-sized moving image corresponding to the selected second-sized moving image, and
wherein the third image includes a gas moving image obtained by processing for removing second frequency component data indicating a temperature change in a background and having a frequency lower than that of first frequency component data caused by a gas leak from the first moving image.

10. The gas detection device according to claim 1, wherein the moving images simultaneously displayed on the display includes the first moving image and the third moving image subjected to the image processing for detecting the gas.

11. The information processing device according to claim 8, wherein the moving images simultaneously displayed on the display includes the first moving image and the third moving image subjected to the image processing for detecting the gas.

12. The non-transitory computer-readable storage medium according to claim 9, wherein the moving images simultaneously displayed on the display includes the first moving image and the third moving image subjected to the image processing for detecting the gas.

13. The gas detection device according to claim 1, wherein the third moving image includes a difference image between frames of the first moving image.

14. The gas detection device according to claim 1, wherein the third moving image includes the gas moving image obtained after further processing for removing third frequency component data having a frequency higher than that of the first frequency component data from the first moving image.

15. The gas detection device according to claim 1, wherein the third moving image includes a fourth moving image obtained after performing a second image processing on the first moving image, and a fifth moving image obtained after performing a third image processing on the first moving image, the third image processing being a type of processing that is different from the second image processing.

16. The gas detection device according to claim 5, wherein the display target image group includes a second moving image captured by the second imager.

17. A gas detection device, comprising:
a first imager configured to capture an image of an inspection region in an infrared region that is influenced by light absorption by gas;
a second imager configured to capture an image of the inspection region in a wavelength range that is not influenced by light absorption by gas; and
a hardware processor configured to perform image processing for detecting a gas on a first image captured by the first imager, and to perform control to simultaneously display various types of images on a display from a display target image group including the first image, a second image captured by the second imager, and a third image subjected to the image processing,
wherein the first image is a moving image, and wherein the third image includes a gas image obtained by processing for removing second frequency component data indicating a temperature change due to a gas leak in a background and having a frequency lower than that of first frequency component data from the first image,
wherein the hardware processor is further configured to perform control to display a first-sized image in a first region of a display surface of the display, to display a second-sized image, smaller than the first-sized image, in a plurality of second regions which are apposed to the first region and are each smaller than, and do not overlap with, the first region, to display various types of images in the first region and the second regions from the display target image group, and, upon selection of the second-sized image displayed in the second region, replacing the first-sized image with the selected second sized-image so as to display in the first region a first-sized image corresponding to the selected second-sized image.

18. The gas detection device according to claim 17, wherein the third image includes the gas image obtained after further processing for removing third frequency component data having a frequency higher than that of the first frequency component data from the first image.

\* \* \* \* \*